United States Patent
Jung et al.

(10) Patent No.: US 11,535,771 B2
(45) Date of Patent: Dec. 27, 2022

(54) SURFACE COATING MATERIALS, FILMS, STACKED STRUCTURES, DISPLAY DEVICES, ARTICLES, AND COATING METHODS

(71) Applicant: Samsung Electronics Co., Ltd., Suwon-si (KR)

(72) Inventors: Won Cheol Jung, Seoul (KR); Byung Ha Park, Yongin-si (KR); Myong Jong Kwon, Suwon-si (KR); Sung Hun Hong, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 351 days.

(21) Appl. No.: 16/816,761

(22) Filed: Mar. 12, 2020

(65) Prior Publication Data
US 2020/0291259 A1    Sep. 17, 2020

(30) Foreign Application Priority Data

Mar. 13, 2019  (KR) .................. 10-2019-0028739

(51) Int. Cl.
| | | |
|---|---|---|
| *C09D 171/02* | (2006.01) | |
| *C09D 7/63* | (2018.01) | |
| *C03C 17/30* | (2006.01) | |
| *B05D 1/00* | (2006.01) | |
| *B05D 3/02* | (2006.01) | |
| *C08G 65/00* | (2006.01) | |
| *C08G 65/336* | (2006.01) | |

(52) U.S. Cl.
CPC ............ *C09D 171/02* (2013.01); *B05D 1/60* (2013.01); *B05D 3/02* (2013.01); *C03C 17/30* (2013.01); *C08G 65/007* (2013.01); *C08G 65/336* (2013.01); *C09D 7/63* (2018.01); *B05D 2203/35* (2013.01); *C03C 2217/76* (2013.01); *C03C 2217/78* (2013.01)

(58) Field of Classification Search
CPC ................................ C09D 171/02; C09D 7/63
USPC ........................................................ 428/421
See application file for complete search history.

(56) References Cited

U.S. PATENT DOCUMENTS

| | | | |
|---|---|---|---|
| 6,200,684 B1 | 3/2001 | Yamaguchi et al. | |
| 6,716,534 B2* | 4/2004 | Moore ................. | C09D 183/12 528/901 |
| 6,991,826 B2 | 1/2006 | Pellerite et al. | |
| 7,094,471 B2 | 8/2006 | Moore et al. | |
| 8,268,067 B2 | 9/2012 | Iyer et al. | |
| 9,296,918 B2 | 3/2016 | Olson et al. | |
| 9,637,650 B2 | 5/2017 | Murotani et al. | |
| 2010/0129672 A1* | 5/2010 | Hao ...................... | C08G 65/336 428/447 |
| 2010/0272910 A1* | 10/2010 | Kishita ................ | C09D 183/04 424/78.09 |
| 2017/0081523 A1 | 3/2017 | Audenaert | |

FOREIGN PATENT DOCUMENTS

| | | |
|---|---|---|
| EP | 2982702 A1 | 2/2016 |
| JP | 2005-508433 A | 3/2005 |
| JP | 2008-214566 A | 9/2008 |
| JP | 4478216 B2 | 6/2010 |
| JP | 2010-254832 A | 11/2010 |
| KR | 10-2016-0135254 A | 11/2016 |
| WO | WO-03040247 A1 | 5/2003 |

* cited by examiner

*Primary Examiner* — Hui H Chin
(74) *Attorney, Agent, or Firm* — Harness, Dickey & Pierce, P.L.C.

(57) ABSTRACT

A surface coating material includes a plurality of fluorine-containing silicon compounds and an additive. The fluorine-containing silicon compounds include a fluorine-containing (poly)ether moiety, a hydrolytic silane moiety, and a linking group between the fluorine-containing (poly)ether moiety and the hydrolytic silane moiety. The linking group is configured to form a non-covalence interaction between adjacent molecules.

27 Claims, 6 Drawing Sheets

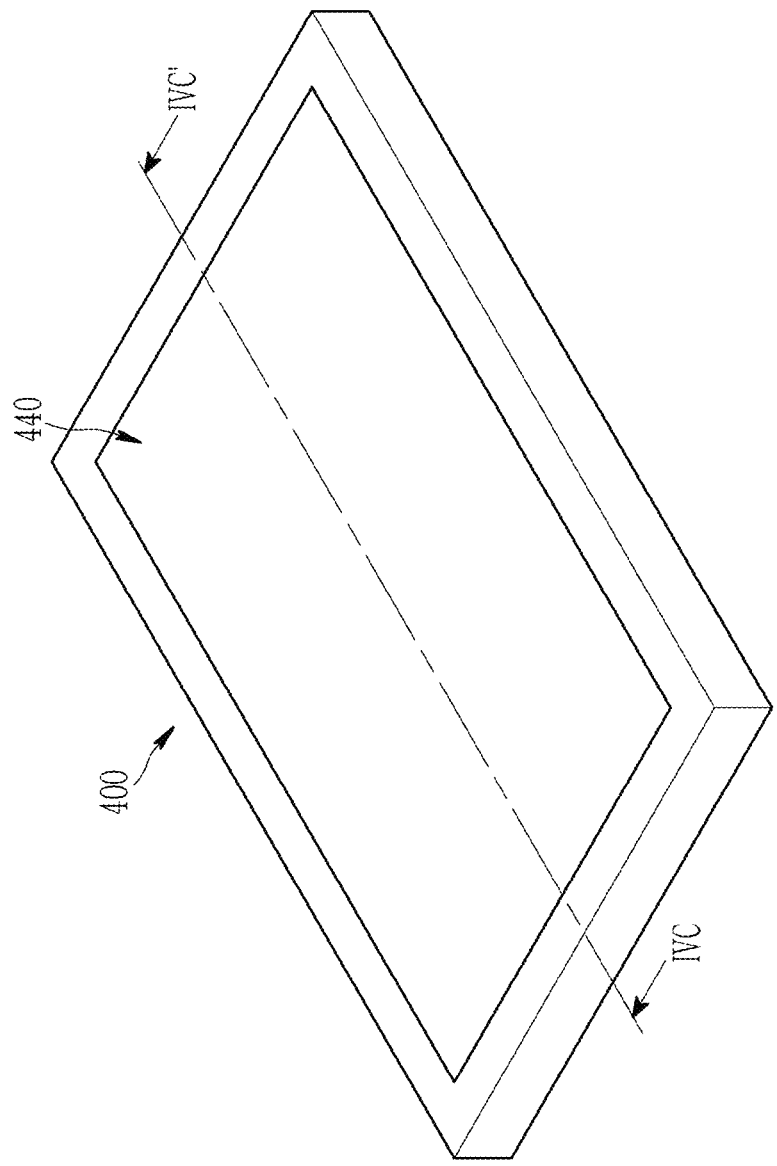

SURFACE COATING MATERIALS, FILMS, STACKED STRUCTURES, DISPLAY DEVICES, ARTICLES, AND COATING METHODS

CROSS-REFERENCE TO RELATED APPLICATION

This application claims priority to and the benefit of Korean Patent Application No. 10-2019-0028739 filed in the Korean Intellectual Property Office on Mar. 13, 2019, the entire contents of which are incorporated herein by reference.

BACKGROUND

1. Field

Surface coating materials, films, stacked structures, display devices, articles, and coating methods are disclosed.

2. Description of the Related Art

Portable electronic devices such as smart phones or tablet PCs may include a functional layer having various functions. In particular, recently, as touch screen panels configured to recognize a contact position using a finger or a tool are universalized, a functional layer may be applied on the surface of a touch screen display panel in order to improve a surface slipping property and a sense of touch of a touch screen panel.

However, such a functional layer has weak durability and may be easily lost or destroyed by frequent contact so that its function may be rapidly lost.

SUMMARY

Some example embodiments provide a surface coating material that is capable of improving durability.

Some example embodiments provide a film that is capable of improving durability.

Some example embodiments provide a stacked structure including the film.

Some example embodiments provide a display device including the film or the stacked structure.

Some example embodiments provide an article coated with the surface coating material.

Some example embodiments provide a coating method of the surface coating material.

According to some example embodiments, a surface coating material may include a plurality of fluorine-containing silicon compounds, and an additive represented by Chemical Formula 1. Each fluorine-containing silicon compound of the plurality of fluorine-containing silicon compounds may include a fluorine-containing (poly)ether moiety, a hydrolytic silane moiety, and a linking group between the fluorine-containing (poly)ether moiety and the hydrolytic silane moiety, the linking group configured to form a non-covalence interaction between adjacent molecules.

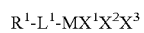  [Chemical Formula 1]

In Chemical Formula 1, $R^1$ may be a halogen, a thiol group, an isocyanate group, or an amino group, $L^1$ may be a substituted or unsubstituted C1 to C20 alkylene group or a substituted or unsubstituted C6 to C20 arylene group, M may be Si, Ti, or Zr, and $X^1$, $X^2$, and $X^3$ may be independently hydrogen, a substituted or unsubstituted C1 to C20 alkoxy group, halogen, a hydroxy group, amide group, a substituted or unsubstituted C1 to C20 alkyl group, a substituted or unsubstituted C6 to C20 aryl group, or a combination thereof. At least one of $X^1$, $X^2$, or $X^3$ may be a substituted or unsubstituted C1 to C20 alkoxy group, a halogen, or a hydroxy group.

The fluorine-containing silicon compounds and the additive represented by Chemical Formula 1 may be included in the surface coating material in a weight ratio of about 1:0.003 to about 1:0.5.

The additive represented by Chemical Formula 1 may include three or more carbons.

The plurality of fluorine-containing silicon compounds may have a linear molecular geometry.

The plurality of fluorine-containing silicon compounds may have a weight average molecular weight of about 4,000 g/mol to about 10,000 g/mol.

The linking group may include a hydrogen-bondable linking group.

The hydrogen-bondable linking group may include *—C(=O)$NR^d$—*, *—OC(=O)$NR^e$—*, *—OC(=O)$NR^f$S(=O)—*, *—OC(=O)$NR^g$S(=O)O—*, or a combination thereof. $R^d$ to $R^g$ may be independently hydrogen, a substituted or unsubstituted C1 to C20 alkyl group, a substituted or unsubstituted C6 to C20 aryl group, or a combination thereof.

Each fluorine-containing silicon compound of the plurality of fluorine-containing silicon compounds may be represented by Chemical Formula 2.

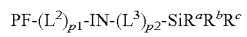  [Chemical Formula 2]

In Chemical Formula 2, PF may be a fluorine-containing (poly)ether moiety, $R^a$, $R^b$, and $R^c$ may be independently hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, at least one of $R^a$, $R^b$, or $R^c$ may be a substituted or unsubstituted C1 to C20 alkoxy group, a halogen, or a hydroxy group, IN may be a linking group including a hydrogen-bondable functional group, $L^2$ and $L^3$ may be independently substituted or unsubstituted C1 to C20 alkylene group, a substituted or unsubstituted C6 to C20 arylene group, a substituted or unsubstituted C1 to C20 oxyalkylene group, or a combination thereof, and p1 and p2 are independently an integer ranging from 0 to 10.

In Chemical Formula 2, PF may be perfluoro(poly)ether.

In Chemical Formula 2, PF may be $CF_3O(CF_2CF_2O)_n(CF_2O)_mCF_2$, and n and m may be independently integers ranging from 1 to 100.

In Chemical Formula 2, IN may be *—C(=O)$NR^d$—*, *—OC(=O)$NR^e$—*, *—OC(=O)$NR^f$S(=O)—*, *—OC(=O)$NR^g$S(=O)O—*, or a combination thereof, and $R^d$ to $R^g$ may be independently hydrogen, a substituted or unsubstituted C1 to C20 alkyl group, a substituted or unsubstituted C6 to C20 aryl group, or a combination thereof.

According to some example embodiments, a film may include a polymer of a plurality of fluorine-containing silicon compounds, and an additive represented by Chemical Formula 1. Each fluorine-containing silicon compound of the plurality of fluorine-containing silicon compounds may include a fluorine-containing (poly)ether moiety, a hydrolytic silane moiety, and a linking group between the fluorine-containing (poly)ether moiety and the hydrolytic silane moiety, the linking group configured to form a non-covalence interaction between adjacent molecules.

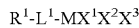  [Chemical Formula 1]

In Chemical Formula 1, $R^1$ is a halogen, a thiol group, an isocyanate group, or an amino group, $L^1$ may be a substituted or unsubstituted C1 to C20 alkylene group or a substituted or unsubstituted C6 to C20 arylene group, M may be Si, Ti, or Zr, and $X^1$, $X^2$, and $X^3$ may be independently hydrogen, a substituted or unsubstituted C1 to C20 alkoxy group, halogen, a hydroxy group, amide group, a substituted or unsubstituted C1 to C20 alkyl group, a substituted or unsubstituted C6 to C20 aryl group, or a combination thereof. At least one of $X^1$, $X^2$, or $X^3$ may be a substituted or unsubstituted C1 to C20 alkoxy group, a halogen, or a hydroxy group.

The polymer of the plurality of fluorine-containing silicon compounds and the additive represented by Chemical Formula 1 may be included in the film in a weight ratio of about 1:0.003 to about 1:0.5.

The additive represented by Chemical Formula 1 may include three or more carbons.

The plurality of fluorine-containing silicon compounds may have a linear molecular geometry.

The plurality of fluorine-containing silicon compounds may have a weight average molecular weight of about 4,000 g/mol to about 10,000 g/mol.

The linking group may include a hydrogen-bondable linking group.

The hydrogen-bondable linking group may include *—C(=O)NR$^d$—*, *—OC(=O)NR$^e$—*, *—OC(=O)NR$^f$S(=O)—*, *—OC(=O)NR$^g$S(=O)O—*, or a combination thereof, and $R^d$ to $R^g$ may be independently hydrogen, a substituted or unsubstituted C1 to C20 alkyl group, a substituted or unsubstituted C6 to C20 aryl group, or a combination thereof.

Each fluorine-containing silicon compound of the plurality of fluorine-containing silicon compounds may be represented by Chemical Formula 2.

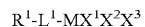  [Chemical Formula 2]

In Chemical Formula 2, PF may be a fluorine-containing (poly)ether moiety, $R^a$, $R^b$, and $R^c$ may be independently hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, at least one of $R^a$, $R^b$, or $R^c$ may be a substituted or unsubstituted C1 to C20 alkoxy group, a halogen, or a hydroxy group, IN may be a linking group including a hydrogen-bondable functional group, $L^2$ and $L^3$ may be independently substituted or unsubstituted C1 to C20 alkylene group, a substituted or unsubstituted C6 to C20 arylene group, a substituted or unsubstituted C1 to C20 oxyalkylene group, or a combination thereof, and p1 and p2 may be independently an integer ranging from 0 to 10.

In Chemical Formula 2, PF may be perfluoro(poly)ether.

In Chemical Formula 2, PF may be $CF_3O(CF_2CF_2O)_n(CF_2O)_mCF_2$, and n and m may be independently integers ranging from 1 to 100.

In Chemical Formula 2, IN may be *—C(=O)NR$^d$—*, *—OC(=O)NR$^e$—*, *—OC(=O)NR$^f$S(=O)—*, *—OC(=O)NR$^g$S(=O)O—*, or a combination thereof, and $R^d$ to $R^g$ may be independently hydrogen, a substituted or unsubstituted C1 to C20 alkyl group, a substituted or unsubstituted C6 to C20 aryl group, or a combination thereof.

The film may be a coated film or a deposited film.

A stacked structure may include a substrate, and the film. The substrate may be a ceramic or a glass plate.

A display device may include the film.

A display device may include the stacked structure.

An article may include a glass substrate coated with the surface coating material.

According to some example embodiments, a method may include providing a glass substrate, and coating the surface coating material of claim 1 on at least one surface of the glass substrate to form a display device.

The coating may include coating the at least one surface of the glass substrate according to a solution process, or depositing the surface coating material on the at least one surface of the glass substrate through a dry process.

The method may further include manufacturing an article including the display device.

According to some example embodiments, a display device may include a display panel configured to display an image, and a film on an outer surface of the display panel. The film may include a plurality of fluorine-containing silicon compounds, and an additive represented by Chemical Formula 1. Each fluorine-containing silicon compound of the plurality of fluorine-containing silicon compounds may include a fluorine-containing (poly)ether moiety, a hydrolytic silane moiety, and a linking group between the fluorine-containing (poly)ether moiety and the hydrolytic silane moiety. The linking group may be configured to form a non-covalence interaction between adjacent molecules.

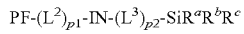  [Chemical Formula 1]

In Chemical Formula 1, $R^1$ may be a halogen, a thiol group, an isocyanate group, or an amino group, $L^1$ may be a substituted or unsubstituted C1 to C20 alkylene group or a substituted or unsubstituted C6 to C20 arylene group, M may be Si, Ti, or Zr, and $X^1$, $X^2$, and $X^3$ may be independently hydrogen, a substituted or unsubstituted C1 to C20 alkoxy group, halogen, a hydroxy group, amide group, a substituted or unsubstituted C1 to C20 alkyl group, a substituted or unsubstituted C6 to C20 aryl group, or a combination thereof. At least one of $X^1$, $X^2$, or $X^3$ may be a substituted or unsubstituted C1 to C20 alkoxy group, a halogen, or a hydroxy group.

The film may include a polymer of the plurality of fluorine-containing silicon compounds.

The plurality of fluorine-containing silicon compounds and the additive represented by Chemical Formula 1 may be included in the film in a weight ratio of about 1:0.003 to about 1:0.5.

The additive represented by Chemical Formula 1 may include three or more carbons.

The plurality of fluorine-containing silicon compounds may have a linear molecular geometry.

The plurality of fluorine-containing silicon compounds may have a weight average molecular weight of about 4,000 g/mol to about 10,000 g/mol.

The linking group may include a hydrogen-bondable linking group.

The hydrogen-bondable linking group may include *—C(=O)NR$^d$—*, *—OC(=O)NR$^e$—*, *—OC(=O)NR$^f$S(=O)—*, *—OC(=O)NR$^g$S(=O)O—*, or a combination thereof, and $R^d$ to $R^g$ may be independently hydrogen, a substituted or unsubstituted C1 to C20 alkyl group, a substituted or unsubstituted C6 to C20 aryl group, or a combination thereof.

Each fluorine-containing silicon compound of the plurality of fluorine-containing silicon compounds may be represented by Chemical Formula 2.

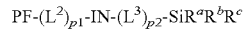  [Chemical Formula 2]

In Chemical Formula 2, PF may be a fluorine-containing (poly)ether moiety, $R^a$, $R^b$, and $R^c$ may be independently hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, at least one of $R^a$, $R^b$, or $R^c$ may be a substituted or unsubstituted C1 to C20 alkoxy group, a halogen, or a hydroxy group, IN may be a linking group including a hydrogen-bondable functional group, $L^2$ and $L^3$ may be independently substituted or unsubstituted C1 to C20 alkylene group, a substituted or unsubstituted C6 to C20 arylene group, a substituted or unsubstituted C1 to C20 oxyalkylene group, or a combination thereof, and p1 and p2 may be independently an integer ranging from 0 to 10.

In Chemical Formula 2, PF may be perfluoro(poly)ether.

In Chemical Formula 2, PF may be $CF_3O(CF_2CF_2O)_n(CF_2O)_mCF_2$, and n and m may be independently integers ranging from 1 to 100.

In Chemical Formula 2, IN may be *—C(=O)NR$^d$—*, *—OC(=O)NR$^e$—*, *—OC(=O)NR$^f$S(=O)—*, *—OC(=O)NR$^g$S(=O)O—*, or a combination thereof, and $R^d$ to $R^g$ may be independently hydrogen, a substituted or unsubstituted C1 to C20 alkyl group, a substituted or unsubstituted C6 to C20 aryl group, or a combination thereof.

The functional layer may have improved durability.

BRIEF DESCRIPTION OF THE DRAWINGS

FIG. 4B is a perspective view of an electronic device according to some example embodiments.

DETAILED DESCRIPTION

Figure 1:
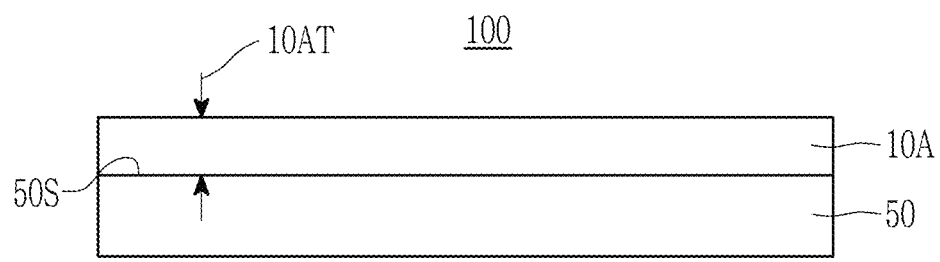
FIG. 1 is a cross-sectional view showing a display device according to some example embodiments.

Some example embodiments of the present disclosure will hereinafter be described in detail and may be easily performed by a person having an ordinary skill in the related art. However, actually applied structures may be embodied in many different forms, and is not to be construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

In the drawings, parts having no relationship with the description are omitted for clarity of some example embodiments, and the same or similar constituent elements are indicated by the same reference numeral throughout the specification.

As used herein, when a definition is not otherwise provided, "substituted" may refer to replacement of a hydrogen atom of a compound by a substituent of a halogen atom, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, or a combination thereof.

As used herein, when a definition is not otherwise provided, "hetero" may refer to one including 1 to 4 heteroatoms of N, O, S, Se, Te, Si, or P.

As used herein, when specific definition is not otherwise provided, "*" indicates a point where the same or different atom (including a hydrogen atom) or chemical formula is linked.

Hereinafter, "combination" refers to a mixture of two or more and a stack structure of two or more.

Hereinafter, a surface coating material according to some example embodiments is described. The surface coating material may be interchangeably referred to herein as a composition.

A surface coating material according to some example embodiments includes a plurality of fluorine-containing silicon compounds and an additive represented by Chemical Formula 1. The plurality of fluorine-containing silicon compounds may be monomers, oligomers, and/or polymers.

  [Chemical Formula 1]

In Chemical Formula 1, $R^1$ is a halogen, a thiol group, an isocyanate group, or an amino group, $L^1$ is a substituted or unsubstituted C1 to C20 alkylene group or a substituted or unsubstituted C6 to C20 arylene group, M is Si, Ti, or Zr, and $X^1$, $X^2$, and $X^3$ are independently hydrogen, a substituted or unsubstituted C1 to C20 alkoxy group, halogen, a hydroxy group, amide group, a substituted or unsubstituted C1 to C20 alkyl group, a substituted or unsubstituted C6 to C20 aryl group, or a combination thereof. At least one of $X^1$, $X^2$, or $X^3$ is a substituted or unsubstituted C1 to C20 alkoxy group, a halogen, or a hydroxy group.

Conventionally, a composition including a plurality of fluorine-containing silicon compounds has been a lot used as a surface coating material but has very weak durability thereof. Accordingly, displays treated with the conventional surface coating material have a problem of looking worn out after about 3 months compared with an initial surface thereof, when examined even with naked eyes (e.g., visually directly observed).

However, the surface coating material according to some example embodiments also includes the additive capable of interacting with the plurality of fluorine-containing silicon compounds and each of the fluorine-containing silicon compounds and thus may remarkably improve the durability of displays (e.g., display panels) coated with the surface coating material according to some example embodiments and thus may remarkably improve the durability of display devices including said displays coated with the surface coating material.

Specifically, the additive is represented by Chemical Formula 1 and thus may have a non-covalence interaction with each of the fluorine-containing silicon compound. Specifically, the additive represented by Chemical Formula 1 includes a functional group represented by $R^1$, and the functional group represented by $R^1$ (a halogen, a thiol group, an isocyanate group, or an amino group) makes the non-covalence interaction between each of the fluorine-containing silicon compounds and the additive possible. Since unshared electron pairs of the halogen, the isocyanate group, the thiol group, and the amino group (which will be described later) forms the non-covalence interaction such as a hydrogen bond and the like with hydrogen atoms of an amide group forming an amide linking group in each of the fluorine-containing silicon compounds, durability of a substrate coated with the surface coating material according to some example embodiments may be remarkably improved.

In some example embodiments, the fluorine-containing silicon compounds and the additive represented by Chemical Formula 1 may be included in the surface coating material in a mole ratio of about 1:0.003 to about 1:0.5, for example about 1:1 to about 1:167. A substrate coated with a surface coating material including the fluorine-containing silicon compounds and the additive represented by Chemical Formula 1 within the weight ratio (or mole ratio) range may exhibit the most excellent durability. In some example embodiments, the fluorine-containing silicon compounds and the additive represented by Chemical Formula 1 may be included in a weight ratio of about 1:0.03, for example a mole ratio of 1:1.

In some example embodiments, the additive represented by Chemical Formula 1 (e.g., a single molecule of the additive as represented by Chemical Formula 1) may include three or more carbons (e.g., three or more carbon atoms).

Each of the plurality of fluorine-containing silicon compounds of the surface coating material (e.g., each fluorine-containing silicon compound of the plurality of fluorine-containing silicon compounds) may respectively include a fluorine-containing (poly)ether moiety and a hydrolytic silane moiety at each terminal end and accordingly, be aligned in one direction due to a surface energy difference of both terminal ends.

Each of the fluorine-containing silicon compounds may include a fluorine-containing (poly)ether moiety at one terminal end, a hydrolytic silane moiety at the other terminal end, and a linking group between the fluorine-containing (poly)ether moiety and the hydrolytic silane moiety. Restated, each of the fluorine-containing silicon compounds may include a fluorine-containing (poly)ether moiety, a hydrolytic silane moiety, and a linking group between the fluorine-containing (poly)ether moiety and the hydrolytic silane moiety.

The fluorine-containing (poly)ether moiety may be for example a (poly)ether having at least one fluorine, for example perfluoro(poly)ether. The fluorine-containing (poly)ether moiety may be for example represented by $CF_3O(CF_2CF_2O)_n(CF_2O)_mCF_2$ (wherein n and m are independently an integer ranging from 1 to 60), but is not limited thereto.

The hydrolytic silane moiety may be silane substituted with at least one hydrolytic functional group, for example silane substituted with at least one substituted or unsubstituted C1 to C20 alkoxy group, a halogen, or a hydroxy group. The hydrolytic silane moiety may be bound to a substrate or a lower layer by a hydrolysis and/or condensation polymerization reaction during a coating or depositing process.

The linking group may be disposed between the fluorine-containing (poly)ether moiety and the hydrolytic silane moiety and may be configured to form a non-covalence interaction with adjacent molecules (e.g., form a non-covalence interaction between adjacent molecules). The non-covalence interaction is not a covalent bond and may be for example a hydrogen bond. In some example embodiments, the linking group may include a hydrogen-bondable linking group.

The linking group capable of forming a hydrogen bond (e.g., hydrogen-bondable linking group) may have (e.g., may include), for example, a heteroatom (having unshared electron pairs) such as nitrogen, oxygen, and/or sulfur and the heteroatom may be, for example, *—C(=O)$NR^d$—*, *—OC(=O)$NR^e$—*, *—OC(=O)$NR^fS$(=O)—*, *—OC(=O)$NR^gS$(=O)O—*, or a combination thereof. $R^d$ to $R^g$ (e.g., $R^d$, $R^e$, $R^f$, and $R^g$) may be independently hydrogen, a substituted or unsubstituted C1 to C20 alkyl group, a substituted or unsubstituted C6 to C20 aryl group, or a combination thereof, but the linking group is not limited thereto.

In some example embodiments, the linking group may be the linking group capable of forming a hydrogen bond.

In some example embodiments, the fluorine-containing silicon compounds (e.g., the plurality of fluorine-containing silicon compounds) may have a linear type (e.g., the molecules of the fluorine-containing silicon compounds may have a linear molecular geometry). As for a branch type that the fluorine-containing silicon compounds include a substituent such as *—$CF_3$ and the like, slipping properties of the surface of a substrate coated with a surface coating material including the same may be deteriorated.

In some example embodiments, the fluorine-containing silicon compounds (e.g., the plurality of fluorine-containing silicon compounds) may have a weight average molecular weight of about 4,000 g/mol to about 10,000 g/mol. When the fluorine-containing silicon compounds have a weight average molecular weight within the range, durability of a surface coating material including the same may be further improved.

In some example embodiments, the fluorine-containing silicon compounds (e.g., each fluorine-containing silicon compound of the plurality of fluorine-containing silicon compounds) may be represented by Chemical Formula 2.

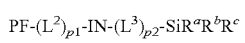  [Chemical Formula 2]

In Chemical Formula 2,

PF is a fluorine-containing (poly)ether moiety, $R^a$, $R^b$, and $R^c$ are independently hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof, wherein at least one of $R^a$, $R^b$, or $R^c$ is a substituted or unsubstituted C1 to C20 alkoxy group, a halogen, or a hydroxy group, IN is a linking group including a hydrogen-bondable functional group, $L^2$ and $L^3$ are independently substituted or unsubstituted C1 to C20 alkylene group, a substituted or unsubstituted C6 to C20 arylene group, a substituted or unsubstituted C1 to C20 oxyalkylene group, or a combination thereof, and p1 and p2 are independently an integer ranging from 0 to 10.

In some example embodiments, PF may be for example perfluoro(poly)ether, for example $CF_3O(CF_2CF_2O)_n(CF_2O)_mCF_2$, wherein n and m are independently integers ranging from 1 to 100.

In some example embodiments, one of $R^a$, $R^b$, or $R^c$ may be a substituted or unsubstituted C1 to C20 alkoxy group, a halogen, or a hydroxy group.

In some example embodiments, two of $R^a$, $R^b$, and $R^c$ may be a substituted or unsubstituted C1 to C20 alkoxy group, a halogen, or hydroxy group.

In some example embodiments, $R^a$, $R^b$, and $R^c$ may independently be a substituted or unsubstituted C1 to C20 alkoxy group, a halogen, or a hydroxy group.

In some example embodiments, IN may be a hydrogen-bondable functional group and may be for example *—C(=O)NR$^d$—*, *—OC(=O)NR$^e$—*, *—OC(=O)NR$^f$S(=O)—*, *—OC(=O)NR$^g$S(=O)O—*, or a combination thereof, wherein $R^d$ to $R^g$ are independently hydrogen, a substituted or unsubstituted C1 to C20 alkyl group, a substituted or unsubstituted C6 to C20 aryl group, or a combination thereof.

In some example embodiments, $L^2$ and $L^3$ may independently be a substituted or unsubstituted methylene group, a substituted or unsubstituted ethylene group, a substituted or unsubstituted propylene group, a substituted or unsubstituted butylene group, a substituted or unsubstituted pentylene group, a substituted or unsubstituted hexylene group, a substituted or unsubstituted phenylene group, a substituted or unsubstituted biphenylene group, a substituted or unsubstituted naphthylene group, a substituted or unsubstituted oxymethylene group, a substituted or unsubstituted oxyethylene group, a substituted or unsubstituted oxypropylene group, or a combination thereof.

In some example embodiments, the fluorine-containing silicon compounds may be represented by Chemical Formula Chemical Formula 2A or Chemical Formula 2B.

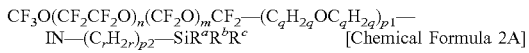
[Chemical Formula 2A]

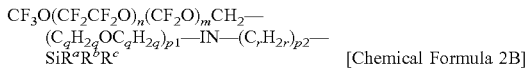
[Chemical Formula 2B]

In Chemical Formula 2A and Chemical Formula 2B,

IN, $R^a$, $R^b$, $R^c$, n, m, p1, and p2 are the same as described above, and q and r are independently integers ranging from 1 to 5.

In some example embodiments, the fluorine-containing silicon compounds may be represented by Chemical Formula 2A-1 or Chemical Formula 2B-1.

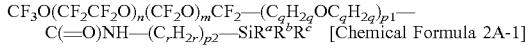
[Chemical Formula 2A-1]

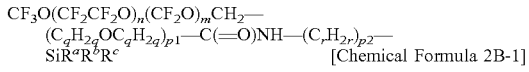
[Chemical Formula 2B-1]

In Chemical Formula 2A-1 and Chemical Formula 2B-1, $R^a$, $R^b$, $R^c$, n, m, p1, p2, q, and r are the same as described above.

The surface coating material according to some example embodiments includes the plurality of fluorine-containing silicon compounds respectively including the linking group capable of forming a non-covalence interaction with adjacent molecules between the fluorine-containing (poly)ether moiety and the hydrolytic silane moiety along with the additive represented by Chemical Formula 1 and accordingly, may firmly maintain the interaction among adjacent molecular chains and thus reduce or prevent damage and/or destruction of the bonding of the plurality of fluorine-containing silicon compounds due to frequent frictions. Accordingly, the surface coating material may not be easily worn away due to the frequent frictions but have reinforced durability and thus may improve the durability of a display device that includes the surface coating material coating some or all of at least one surface of a substrate thereof (e.g., at least one surface of a display panel and/or touch screen panel of the display device).

Figure 2:
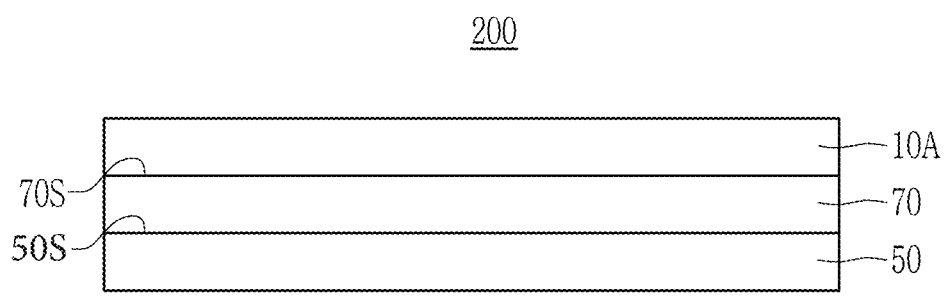
FIG. 2 is a cross-sectional view showing a display device according to some example embodiments.

The aforementioned surface coating material may be formed into a film (e.g., functional film 10A as shown in FIGS. 1-2) by a coating through a solution process or by deposition through a dry process. Accordingly, the film may be a coated film or a deposited film.

Figure 5:
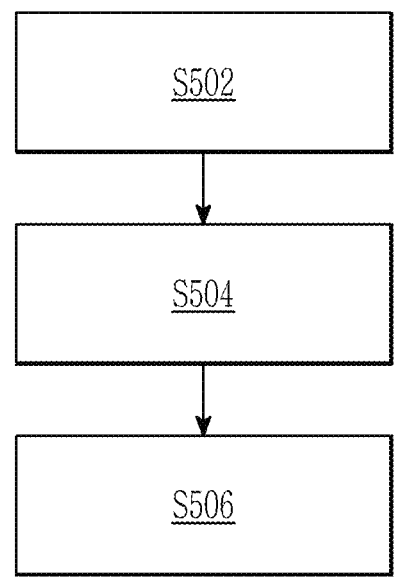
FIG. 5 is a flowchart illustrating a method of manufacturing a display device and/or article according to some example embodiments.

FIG. 5 is a flowchart illustrating a method of manufacturing a display device and/or article according to some example embodiments.

At S502, and according to some example embodiments, a substrate is provided, for example placed on a support surface in a process chamber. The substrate provided at S502 may be any substrate according to any of the example embodiments, for example a glass substrate (glass plate). The substrate may include the display panel 50 and/or the touch screen panel 70 according to any example embodiments).

At S504, the surface coating material according to any of the example embodiments is applied to (e.g., coated on) a top surface (e.g., 50S and/or 70S) of the substrate to coat some or all of at least one surface of the substrate to form a display device according to any of the example embodiments (e.g., the display device 100 and/or the display device 200). The applying (e.g., coating) the surface coating material may include coating some or all of the substrate according to a solution process, wherein some or all of the substrate is coated with a solution including the surface coating material dissolved or dispersed in a solvent. Such solution process methods may be implemented via well-known solution processes for coating a material on at least one surface of a substrate. The applying (e.g., coating) the surface coating material may include coating some or all of the substrate according to a process including spin coating, slit coating, inkjet printing, spray coating, or dipping the substrate and then, drying the coating on the substrate. The applying (e.g., coating) the surface coating material may include depositing the surface coating material on some or all of the substrate to form a deposited film on the substrate according to a dry process, where deposited film may be obtained (e.g., formed on the substrate), in some example embodiments, according to a method of a thermal deposition, a vacuum deposition, or a chemical vapor deposition (CVD). Such dry process methods may be implemented via well-known dry processes for coating a material on at least one surface of a substrate.

At S506, an article is manufactured such that the display device formed according to S502 and S504 is incorporated into the article. The article may include a mobile display device, an automotive display, a sensor, an optical article, an electronic device, a combination thereof, or the like but is not limited thereto. The article may be manufactured according to any well-known methods for manufacturing said article to incorporate the display device formed according to S502 and S504. For example, the article may be an electronic device that includes a processor, memory, and electronic connections to connect a display device to the processor and memory (e.g., via a bus), and the manufacturing at S506 may include coupling the display device formed at S504 to the processor and memory (e.g., via coupling the display device to a bus) to manufacture the article.

The film may be formed on a substrate and the substrate may be for example a ceramic or a glass plate, but is not limited thereto.

The film may include a condensation polymerization product of the plurality of fluorine-containing silicon compounds (e.g., a polymer of the plurality of fluorine-containing silicon compounds) and the additive represented by Chemical Formula 1, wherein the condensation polymerization product of the plurality of fluorine-containing silicon compounds and the additive represented by Chemical Formula 1 may be included in a weight ratio of about 1:0.003 to about 1:0.5, for example about 1:1 to about 1:167. The additive represented by Chemical Formula 1 may include three or more carbons. Each of the fluorine-containing silicon compounds (e.g., each fluorine-containing silicon compound of the fluorine-containing silicon compounds) may include the fluorine-containing (poly)ether moiety, the hydrolytic silane moiety, and the linking group linking group between the fluorine-containing (poly)ether moiety and the hydrolytic silane moiety, where the linking group is configured to form a non-covalence interaction between adjacent molecules, as described above.

Herein, the hydrolytic silane moiety of the fluorine-containing silicon compounds is bound on the substrate side, while the fluorine-containing (poly)ether moiety may be aligned on the surface (air) side. The plurality of fluorine-containing silicon compounds may be substantially aligned along a vertical direction.

The fluorine-containing silicon compounds of the condensation polymerization product and the additive represented by Chemical Formula 1 are the same as described above.

The film may have a high contact angle by having the fluorine-containing (poly)ether moiety on the surface. Accordingly, satisfactory slipping property and water repellency may be obtained. The film may have for example a contact angle of greater than or equal to about 100°, greater than or equal to about 105°, greater than or equal to about 110°, or greater than or equal to about 115°. Herein, the contact angle may be measured by using a Sessile drop technique. A liquid used for measuring the contact angle may be water and a Drop shape analyzer (DSA100, KRUSS, Germany) is used to measure the contact angle by dropping a particular (or, alternatively, predetermined) amount of water (about 3 ul) on the film.

The film may maintain a high contact angle after frequent frictions. Durability of the film may be examined through a change of the contact angle after a plurality of frictions. In some example embodiments, the film may have a contact angle change of less than or equal to about 20°, less than or equal to about 18°, less than or equal to about 15°, less than or equal to about 12°, and less than or equal to about 10° after the 5000 times' abrasion test with an eraser under a load of about 1 kg. In some example embodiments, the film may have a contact angle of greater than or equal to about 100° after the abrasion test with an eraser under a load of about 1 kg.

On the other hand, the film may be measured with respect to a contact angle by using not water but diiodomethane. Herein, in some example embodiments, the contact angle may be greater than or equal about 90°, in some example embodiments, greater than or equal about 95°, or greater than or equal about 97°. Herein, the contact angle may be measured by using a Sessile drop technique. A liquid used for measuring the contact angle may be water and a Drop shape analyzer (DSA100, KRUSS, Germany) is used to measure the contact angle by dropping a particular (or, alternatively, predetermined) amount of water (about 2.7 ul) on the film.

The substrate and the film may form a stacked structure. The stacked structure may further include at least one layer between the substrate and the film.

The stacked structure may be a transparent film, for example a transparent flexible film.

In some example embodiments, the film or the stacked structure may be attached on the display panel. Herein, the display panel and the film or the stacked structure may be directly bonded or may be bonded by interposing an adhesive. The display panel may be for example a liquid crystal panel or an organic light emitting panel, but is not limited thereto. The film or the stacked structure may be disposed on the side of an observer.

FIG. 1 is a cross-sectional view showing a display device according to some example embodiments.

Referring to FIG. 1, a display device 100 according to some example embodiments includes a display panel 50 and a functional film 10A. The functional film 10A may be any of the example embodiments of a film (also referred to as coating layer) including any example embodiments of the surface coating material as described herein.

The display panel 50 may be for example an organic light emitting panel or a liquid crystal panel, for example a bendable display panel, a foldable display panel, or a rollable display panel. In some example embodiments, the display panel 50 may be the substrate as described herein. The functional film 10A and the display panel 50 may be referred to as a stacked structure. In some example embodiments, the display device 100 may include the functional film 10A without a substrate.

As shown, the functional film 10A may be directly or indirectly on the surface 50S of the display panel 50. The functional film 10A may include the film or stacked structure as described herein with reference to any example embodiments and may be disposed on the side of an observer (e.g., between the display panel 50 and an exterior of the display device 100). Another layer may be further disposed between the display panel 50 and the functional film 10A and may include for example a monolayer or plural layers of polymer layer (not shown) and optionally a transparent adhesive layer (not shown). The functional film 10A may have a thickness 10 AT of about 1 nm to about 20 nm, for example about 5 nm to about 20 nm.

FIG. 2 is a cross-sectional view of a display device according to some example embodiments.

Referring to FIG. 2, a display device 200 according to some example embodiments includes a display panel 50, a functional film 10A, and a touch screen panel 70 disposed between the display panel 50 and the functional film 10A. As shown, the functional film 10A may be directly or indirectly on the surface 70S of the touch screen panel 70, and the touch screen panel 70 may be directly or indirectly on the surface 50S of the display panel 50. The functional film 10A, the touch screen panel 70, and the display panel 50 may be referred to as a stacked structure.

The display panel 50 may be for example an organic light emitting panel or a liquid crystal panel, for example a bendable display panel, a foldable display panel, or a rollable display panel.

The functional film 10A may include the film or the stacked structure and may be disposed on the side of an observer.

The touch screen panel 70 may be disposed adjacent to each of the functional film 10A and the display panel 50 to configure the touch screen panel 70 to recognize the touched position and the position change when is touched by a human hand or an object through the functional film 10A and then to output a touch signal (e.g., to a processor of the display device 200 and/or a processor of an electronic device that includes the display device 200). The driving module (not shown) may monitor a position where is touched from the output touch signal; recognize an icon marked at the touched position, and control to carry out functions corresponding to the recognized icon, and the function performance results are displayed on the display panel 50. In some example embodiments, the touch screen panel 70 may be the substrate as described herein. In some example embodiments, a combination of the touch screen panel 70 and the display panel 50 may be the substrate as described herein.

Another layer may be further disposed between the touch screen panel 70 and functional film 10A and may include for example a monolayer or plural layers of polymer layer (not shown) and optionally a transparent adhesive layer (not shown).

Another layer may be further interposed between the touch screen panel 70 and the display panel 50 and may include for example a monolayer or plural layers of polymer layer (not shown) and optionally a transparent adhesive layer (not shown).

The functional film 10A including the aforementioned film or stacked structure may be applied to (e.g., included in) a variety of electronic devices such as a display device, for example a smart phone, a tablet PC, a camera, a touch screen device, and so on, but is not limited thereto.

Some example embodiments provides an article manufactured by coating the aforementioned surface coating material on a substrate, in some example embodiments, a glass substrate (a glass plate). Herein, the article may include a mobile display device, an automotive display, a sensor, an optical article, an electronic device, a combination thereof, or the like but is not limited thereto.

Figure 4A:
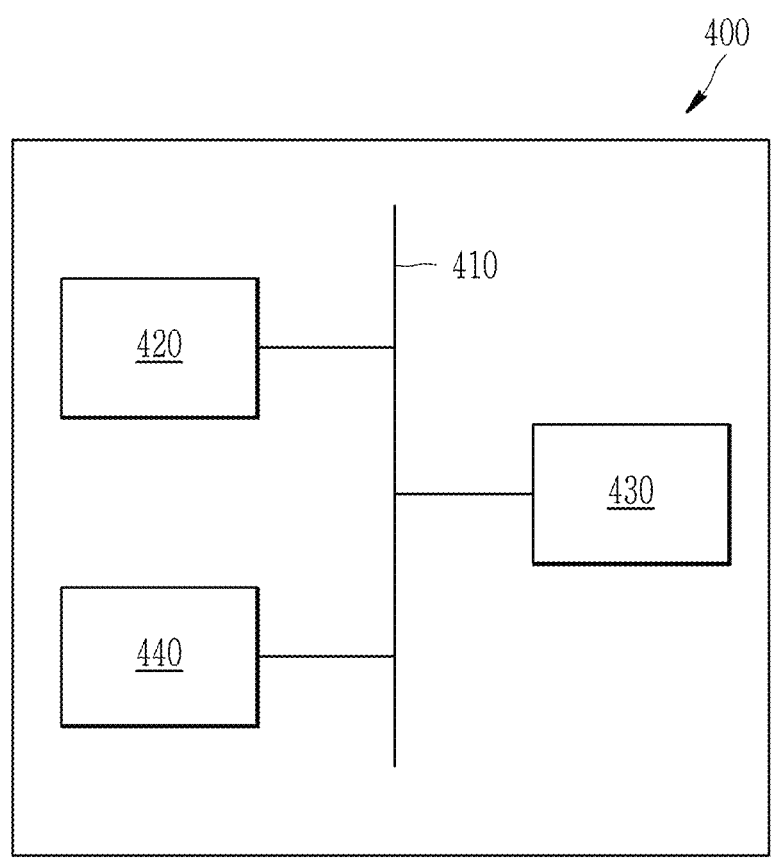
FIG. 4A is a schematic diagram of an electronic device according to some example embodiments.

FIG. 4A is a schematic diagram of an article that is an electronic device 400 according to some example embodiments.

As shown in FIG. 4A, an article that is an electronic device 400 may include a processor 420, a memory 430, and a display device 440 that are electrically coupled together via a bus 410. The display device 440 may be a display device any of the example embodiments as described herein (e.g., display device 100 and/or display device 200), including a display device including at least a display panel and a film that includes any of the example embodiments of compositions described herein. The memory 430, which may be a non-transitory computer readable medium, may store a program of instructions. The processor 420 may execute the stored program of instructions to perform one or more functions. For example, the processor 420 may be configured to process electric signals generated by the display device 440. The processor 420 may be configured to generate an output (e.g., an image to be displayed on the display device 440) based on processing the electric signals.

Figure 4C:
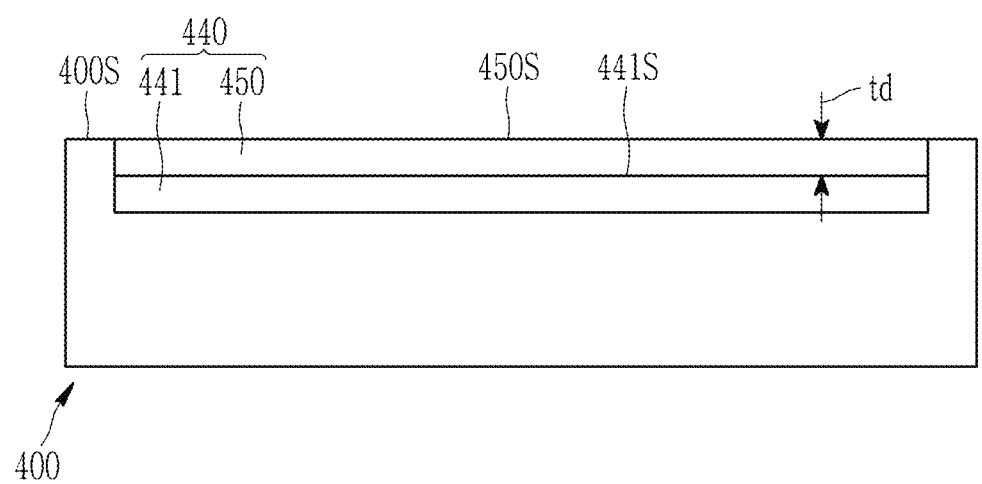
FIG. 4C is a cross-sectional view, along view line IVC-IVC' of FIG. 4B, of the electronic device of FIG. 4B according to some example embodiments.

FIG. 4B is a perspective view of an article that is an electronic device 400 according to some example embodiments. FIG. 4C is a cross-sectional view, along view line IVC-IVC' of FIG. 4B, of the electronic device 400 of FIG. 4B according to some example embodiments. The electronic device 400 shown in FIGS. 4B-4C may be the electronic device 400 shown in FIG. 4A.

As shown in FIGS. 4B-4C, an article that is an electronic device 400 may include a substrate 441 and a film 450 on the substrate 441 (e.g., coated on the substrate 441 as a coating). The substrate 441 may be a glass substrate or ceramic substrate. The substrate 441 may be understood to be coated with the surface coating material according to any of the example embodiments, where the coated surface coating material at least partially comprises the film 450. The substrate 441 may be a display panel of a display device 440 of the electronic device 400, as shown, where the display device 440 includes the substrate 441 and the film 450, but example embodiments are not limited thereto. The film 450 may be partially or completely transparent in at least some or all of the visible wavelength ray regions and/or some or all non-visible wavelength ray regions, such that the substrate 441 may be partially or completely observable from an exterior of the electronic device 400 and/or display device 440 through the film 450. As shown in FIG. 4C, the electronic device 400 and/or display device 440 may be configured such that the outer surface 450S of the film 450 is coplanar ("flush") or substantially coplanar ("substantially flush") (e.g., coplanar within manufacturing tolerances and/or material tolerances) with one or more outer surfaces 400S of the electronic device 400 and/or display device 440, including one or more outer surfaces 400S that may be directly adjacent to the outer surface 450S so that the outer surface 450S and the one or more outer surfaces 400S collectively define a continuous or substantially continuous (e.g., continuous within manufacturing tolerances and/or material tolerances) surface of at least a portion of the electronic device 400 and/or display device 440. As shown, the electronic device 400 and/or display device 440 may be configured to cause the outer surface 450S to be coplanar or substantially coplanar with the one or more outer surfaces 400S based on the substrate 441 being inset into the volume space defined by the outer surfaces 400S of the electronic device 400 by an inset distance "td" that matches or substantially matches (e.g., matches within manufacturing tolerances and/or material tolerances) the thickness of the film 450, as shown in FIG. 4C.

As shown in FIG. 4C, the film 450 and substrate 441 may at least partially comprise a display device 440 that may have all of the features of the display device 100 shown in FIG. 1, where the film 450 may have all of the features of functional film 10A and the substrate 441 may have all of the features of display panel 50. It will also be understood that, in some example embodiments, the film 450 and substrate 441 may at least partially comprise a display device 440 that may have all of the features of the display device 200 shown in FIG. 2, where the film 450 may have all of the features of functional film 10A, the substrate 441 may have all of the features of display panel 50, and the electronic device 400 may further include a touch screen panel 70 interposing between the substrate 441 and the film 450, where the substrate 441 may be inset into the volume space defined by the outer surfaces 400S of the electronic device 400 by an inset distance "td" that matches or substantially matches (e.g., matches within manufacturing tolerances and/or material tolerances) the combined thickness of the film 450 and the touch screen panel 70, and the touch screen panel 70 may be inset into the volume space defined by the outer surfaces 400S of the electronic device 400 by an inset distance that matches or substantially matches (e.g., matches within manufacturing tolerances and/or material tolerances) the thickness of the film 450.

While FIG. 4C shows example embodiments where the outer surface 450S is coplanar or substantially coplanar with a one or more outer surfaces 400S of the electronic device 400, it will be understood that example embodiments are not limited thereto. For example, in some example embodiments, an outer surface 441S of the substrate 441 or touch screen panel 70 of the electronic device 400 may be coplanar or substantially coplanar with the one or more outer surfaces 400S of the electronic device 400, such that the outer surface 450S of the film 450 protrudes outward from a plane defined by the one or more outer surfaces 400S of the electronic device 400 by a distance corresponding to the thickness of the film 450.

Hereinafter, some example embodiments are illustrated in more detail with reference to examples, including example embodiments of electronic devices 400 that are shown in FIGS. 4A-5B. However, the inventive concepts are not limited to these example embodiments.

SYNTHESIS EXAMPLES

Synthesis Example 1

[Reaction Scheme 1]

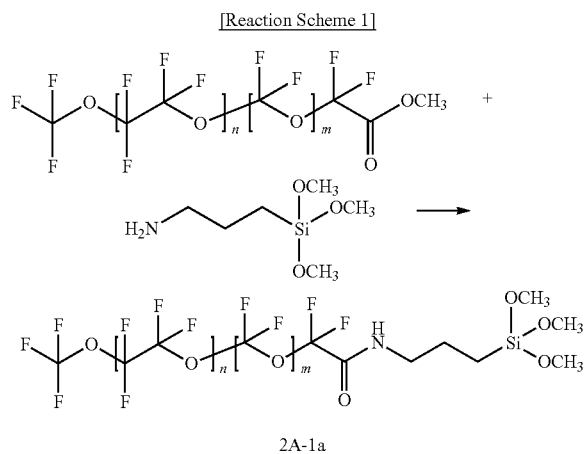

2A-1a 2 equivalents of 3-aminopropyl trimethoxysilane is added to 1 equivalent of perfluoropolyether methylester (Mw: 5000 g/mol) and then, stirred for 5 hours at 25° C. Subsequently, a non-reactant is removed therefrom with a rotatory pump, a product therefrom is washed with a Novec-7500 solvent and methanol, a methanol layer is removed therefrom, and the Novec 7500 is removed under vacuum to obtain a compound represented by Chemical Formula 2A-1a (Trifluoromethyl-poly(oxy-1,1,2,2-tetrafluoroethylene)-poly(oxy-difluoromethylene)(N-propyl-3-trimethoxysilyl)(2,2-difluoro)ethanamide).

Figure 3:
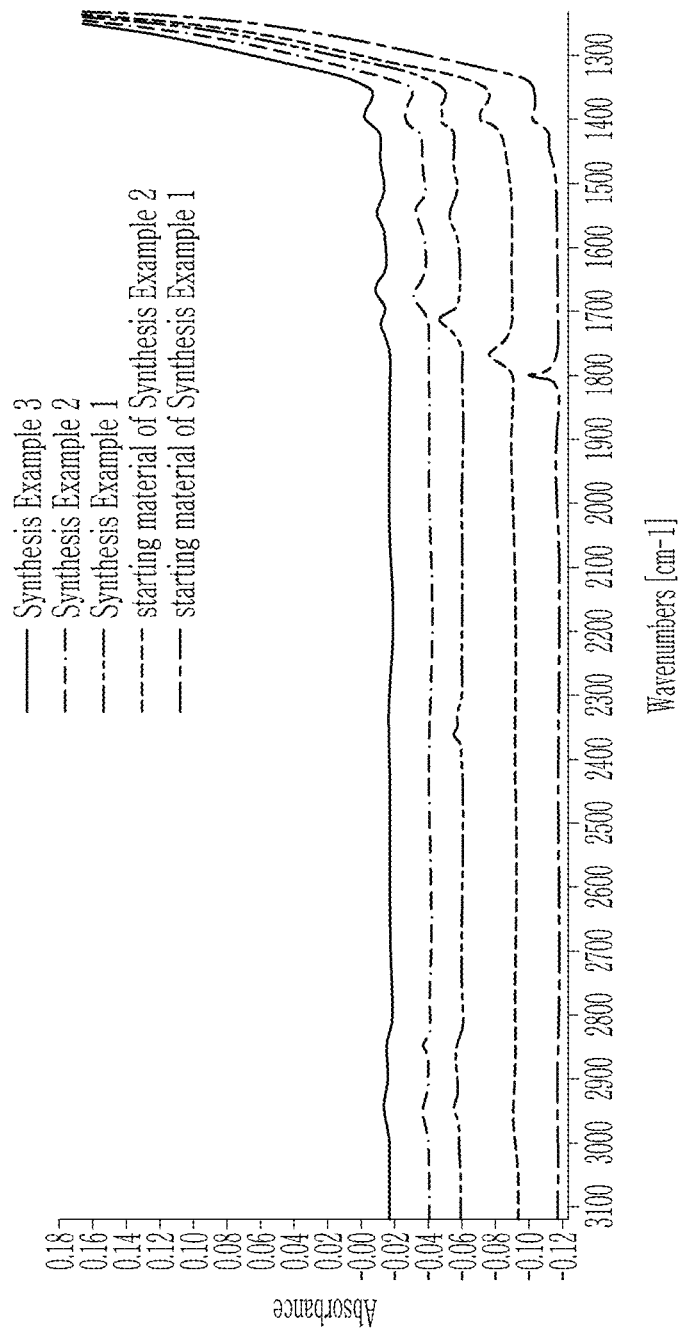
FIG. 3 is each FT-IR graph of the compounds obtained in Synthesis Example 1 to Synthesis Example 3 and esters that are starting materials.

FIG. 3 is a FT-IR graph showing the compound obtained in Synthesis Example 1 and the perfluoropolyether methylester (Mw: 5000 g/mol).

Synthesis Example 2

[Reaction Scheme 2]

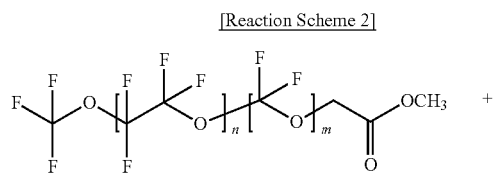

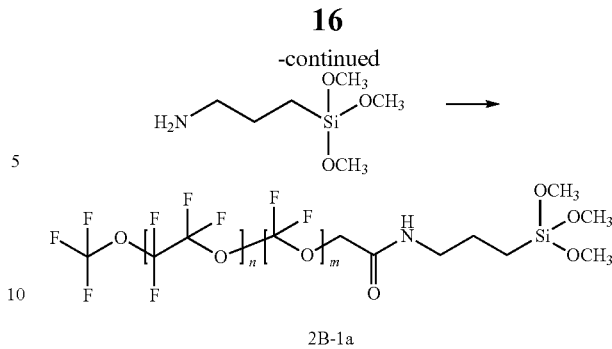

2B-1a 1 equivalent of 3-aminopropyl trimethoxysilane and 1 equivalent of perfluoropolyether methylester (Mw: 6000 g/mol) is added to a Novec-7200 solvent (3M) and then, stirred for 16 hours at 50° C. Subsequently, after removing a nonreactant therefrom with a rotatory pump, a product therefrom is washed with a Novec-7500 solvent and methanol, a methanol layer is removed therefrom, and the Novec 7500 solvent is removed therefrom under vacuum to obtain a compound represented by Chemical Formula 2B-1a (Trifluoromethyl-poly(oxy-1,1,2,2-tetrafluoroethylene)-poly(oxy-difluoromethylene)(N-propyl-3-trimethoxysilyl)ethanamide).

FIG. 3 is a FT-IR graph showing the compound obtained in Synthesis Example 2 and the perfluoropolyether methylester (Mw: 6000 g/mol).

Synthesis Example 3

The compound of Synthesis Example 1 and the compound of Synthesis Example 2 are mixed in a weight ratio of 1:2 (1:2 weight mixture of Trifluoromethyl-poly (oxy-1,1,2,2-tetrafluoroethylene)-poly(oxy-difluoromethylene)(N-propyl-3-trimethoxysilyl)(2,2-difluoro)ethanamide and Trifluoromethyl-poly (oxy-1,1,2,2-tetrafluoroethylene)-poly(oxy-difluoromethylene)(N-propyl-3-trimethoxysilyl) ethanamide).

FIG. 3 is each FT-IR graph showing the compound obtained in Synthesis Example 3, the perfluoropolyether methylester (Mw: 6000 g/mol), and the perfluoropolyether methylester (Mw: 5000 g/mol).

EXAMPLES

Example 1

The compound of Synthesis Example 1 is mixed at a concentration of 0.2 wt % with a Novec-7200 solvent (3M), 3-aminopropyl trimethoxysilane is added thereto in a mole ratio of 1:1 to prepare a composition. Subsequently, the composition is wet-coated on a glass substrate on which 7 nm-thick $SiO_2$ is thermally deposited, dried at room temperature for 20 minutes, and baked on a hot plate at 150° C. for 30 minutes to form a 10 nm-thick film.

Example 2

The compound of Synthesis Example 2 is mixed at a concentration of 20 wt % with a Novec-7200 solvent (3M), 3-aminopropyl trimethoxysilane is added thereto in a mole ratio of 1:2 to prepare a composition. Subsequently, the composition is dry-coated through vacuum-deposition on a glass substrate on which 7 nm-thick $SiO_2$ is thermally deposited, dried at room temperature for 20 minutes, and baked on a hot plate at 150° C. for 30 minutes to form a 10 nm-thick film.

Example 3

A film is formed according to the same method as Example 2 except that the compound of Synthesis Example 3 is used instead of the compound of Synthesis Example 1.

Example 4

A film is formed according to the same method as Example 2 except that a compound represented by Chemical Formula 2A-1a of Synthesis Example 1 but having a weight average molecular weight ranging from 5000 g/mol to 5500 g/mol is used instead of the compound of Synthesis Example 1, and 1 equivalent of HS—$C_3H_6$—Si(OMe)$_3$ is added thereto instead of the 3-aminopropyl trimethoxysilane in Example 1.

Example 5

A film is formed according to the same method as Example 2 except that a compound represented by Chemical Formula 2A-1a of Synthesis Example 1 but having a weight average molecular weight ranging from 5000 g/mol to 5500 g/mol is used instead of the compound of Synthesis Example 1, and 1 equivalent of OCN—$C_3H_6$—Si(OMe)$_3$ is added thereto instead of the 3-aminopropyl trimethoxysilane in Example 1.

Example 6

A film is formed according to the same method as Example 2 except that a compound represented by Chemical Formula 2A-1a of Synthesis Example 1 but having a weight average molecular weight ranging from 5000 g/mol to 5500 g/mol is used instead of the compound of Synthesis Example 1.

Example 7

A film is formed according to the same method as Example 2 except that a compound represented by Chemical Formula 2A-1a of Synthesis Example 1 but having a weight average molecular weight ranging from 5000 g/mol to 5500 g/mol is used instead of the compound of Synthesis Example 1, and the compound represented by Chemical Formula 2A-1a of Synthesis Example 1 but having a weight average molecular weight ranging from 5000 g/mol to 5500 g/mol and the 3-aminopropyl trimethoxysilane are used in a mole ratio of 1:2 in Example 1.

Example 8

A film is formed according to the same method as Example 2 except that the compound of Synthesis Example 1 and the 3-aminopropyl trimethoxysilane are used in a mole ratio of 1:2 in Example 1.

Example 9

A film is formed according to the same method as Example 2 except that the compound of Synthesis Example 2 and the 3-aminopropyl trimethoxysilane are used in a mole ratio of 1:4 in Example 2.

Comparative Example 1

A film is formed according to the same method as Example 2 except that a compound represented by Chemical Formula 2B-1a of Synthesis Example 2 but having a weight average molecular weight ranging from 3200 g/mol is used instead of the compound of Synthesis Example 2, and the compound represented by Chemical Formula 2B-1a of Synthesis Example 2 but having a weight average molecular weight of 3200 g/mol and the 3-aminopropyl trimethoxysilane are used in a mole ratio of 1:1 in Example 2.

Comparative Example 2

A film is formed according to the same method as Example 2 except that a compound represented by Chemical Formula 2B-1a of Synthesis Example 2 but having a weight average molecular weight of 1700 g/mol is used instead of the mixture of the compound of Synthesis Example 2 and the 3-aminopropyl trimethoxysilane in Example 2.

Comparative Example 3

A film is formed according to the same method as Example 2 except that a compound represented by Chemical Formula 2B-1a of Synthesis Example 2 but having a weight average molecular weight of 3200 g/mol is used instead of the mixture of the compound of Synthesis Example 2 and the 3-aminopropyl trimethoxysilane in Example 2.

Comparative Example 4

A film is formed according to the same method as Example 2 except that perfluoropolyethylene (UD-509; Daikin Industries Ltd.) (Mw: 4000 g/mol) is used instead of the mixture of the compound of Synthesis Example 1 and the 3-aminopropyl trimethoxysilane in a mole ratio of 1:1 in Example 1.

Comparative Example 5

A film is formed according to the same method as Example 1 except that a compound represented by Chemical Formula 2A-1a of Synthesis Example 1 but having a weight average molecular weight ranging from 5000 g/mol to 5500 g/mol is used in Example 1.

Evaluation

Evaluation I

Durability of films according to Examples 1 to 9 and Comparative Examples 1 to 5 is evaluated.

The durability of the films is evaluated by measuring a contact angle change due to a friction.

An initial contact angle is evaluated by using a Sessile drop technique and measured by dropping water and diiodomethane on each film with a Drop shape analyzer (DSA100, KRUSS, Germany). Subsequently, the films are respectively (5000 times, 15000 times, 25000 times, 35000 times, and 40000 times) rubbed with a polyurethane rubber eraser having a load of 1 kg and a width of 6 mm until a water contact angle change reaches 20° or so (or the water contact angle change is greater than 20°). The rubbing is at most 40000 times performed, but when the water contact angle change does not reach close to 20° despite the rubbing of 40000 times, the water contact angle change after the rubbing of 40000 times is shown in Table 2. The water contact angle change in Table 2 is expressed as "-". In some example embodiments, in Table 2, Example 1 shows a water contact angle change of 11.3° after the 40000 rubbing times, Example 2 shows a water contact angle change of 9.6° after the 35000 rubbing times, and accordingly, the water contact angle change is greater than 20° before the rubbing times reach 40000 times. Comparative Example 5 shows a water contact angle change of less than 20° after 15000 rubbing times but a water contact angle change of 49.6°, which is greater than 20° after 25000 rubbing times.

The results are shown in Table 1 and Table 2.

TABLE 1

|  | Initial contact angle (°) (water) | Initial contact angle (°) (diiodomethane) |
|---|---|---|
| Example 1 | 119.1 | 101 |
| Example 2 | 117.9 | 97.3 |
| Example 3 | 118.4 | 99.6 |
| Example 4 | 117.3 | 100.3 |
| Example 5 | 117.2 | 100 |
| Example 6 | 117.6 | 99.1 |
| Example 7 | 117.8 | 99.8 |
| Example 8 | 117.8 | 99.3 |
| Example 9 | 118.7 | 97.7 |
| Comparative Example 1 | 118 | 99 |
| Comparative Example 2 | 119.1 | 103.1 |
| Comparative Example 3 | 117.8 | 99.2 |
| Comparative Example 4 | 117.3 | 99.9 |
| Comparative Example 5 | 118.5 | 99.8 |

TABLE 2

|  | 5000 times eraser rubbing | 15000 times eraser rubbing | 25000 times eraser rubbing | 35000 times eraser rubbing | 40000 times eraser rubbing |
|---|---|---|---|---|---|
| Example 1 |  |  |  |  | 107.8°(−11.3°) |
| Example 2 |  |  |  | 108.3° (−9.6°) | Not Good(NG) |
| Example 3 |  |  | 106.4° (−12°) | (NG) | (NG) |
| Example 4 |  |  |  | 100.9° (−16.4°) | (NG) |
| Example 5 |  |  |  | 100.4° (−16.8°) | (NG) |
| Example 6 |  |  |  | 101.9° (−15.7°) | (NG) |
| Example 7 |  |  |  | 98.6° (−19.2°) | (NG) |
| Example 8 |  |  | 98.7° (−19.1°) | (NG) | (NG) |
| Example 9 |  |  | 100.7° (−18°) | (NG) | (NG) |
| Comparative Example 1 |  | 84.6° (−33.4°) | (NG) | (NG) | (NG) |
| Comparative Example 2 | 94.3° (−24.8°) | (NG) | (NG) | (NG) | (NG) |
| Comparative Example 3 |  | 66.7° (−51.1°) | (NG) | (NG) | (NG) |
| Comparative Example 4 | 88.3° (−29.3°) | (NG) | (NG) | (NG) | (NG) |
| Comparative Example 5 |  |  | 68.9° (−49.6°) | (NG) | (NG) |

Referring to Tables 1 and 2, the films of Examples 1 to 9 show a smaller contact angle change than those of Example 10 and Comparative Examples 1 to 4 and accordingly, satisfactory durability against a friction compared with those of Comparative Examples 1 to 4. Furthermore, referring to Comparative Example 1, a molecular weight of the fluorine-containing silicon compound may be one factor having an influence on the durability.

While this disclosure has been described in connection with what is presently considered to be practical example embodiments, it is to be understood that the inventive concepts are not limited to the disclosed example embodiments. On the contrary, it is intended to cover various modifications and equivalent arrangements included within the spirit and scope of the appended claims.

DESCRIPTION OF SYMBOLS

10A: functional layer
50: display panel
70: touch screen panel
100, 200: display device

What is claimed is:

1. A surface coating material, comprising:
a plurality of fluorine-containing silicon compounds; and
an additive represented by Chemical Formula 1,
wherein each fluorine-containing silicon compound of the plurality of fluorine-containing silicon compounds includes a fluorine-containing (poly)ether moiety, a hydrolytic silane moiety, and a linking group between the fluorine-containing (poly)ether moiety and the hydrolytic silane moiety, the linking group configured to form a non-covalence interaction between adjacent molecules, $R^1$-$L^1$-M$X^1X^2X^3$     [Chemical Formula 1]

wherein, in Chemical Formula 1,
$R^1$ is a halogen, a thiol group, an isocyanate group, or an amino group,
$L^1$ is a substituted or unsubstituted C1 to C20 alkylene group or a substituted or unsubstituted C6 to C20 arylene group,
M is Si, Ti, or Zr, and
$X^1$, $X^2$, and $X^3$ are independently hydrogen, a substituted or unsubstituted C1 to C20 alkoxy group, halogen, a hydroxy group, amide group, a substituted or unsubstituted C1 to C20 alkyl group, a substituted or unsubstituted C6 to C20 aryl group, or a combination thereof,
wherein at least one of $X^1$, $X^2$, or $X^3$ is a substituted or unsubstituted C1 to C20 alkoxy group, a halogen, or a hydroxy group,
wherein the flourine-containing silicon compounds and the additive represented by Chemical Formula 1 are included in the surface coating material in a weight ratio of about 1:0.003 to about 1:0.5,
wherein the plurality of fluorine-containing silicon compounds have a linear molecular geometry.

2. The surface coating material of claim 1, wherein the additive represented by Chemical Formula 1 includes three or more carbons.

3. The surface coating material of claim 1, wherein the plurality of fluorine-containing silicon compounds have a weight average molecular weight of about 4,000 g/mol to about 10,000 g/mol.

4. The surface coating material of claim 1, wherein the linking group includes a hydrogen-bondable linking group.

5. The surface coating material of claim 4, wherein the hydrogen-bondable linking group includes *—C(=O)NR$^d$—*, *—OC(=O)NR$^e$—*, *—OC(=O)NR$^g$S(=O)—*, *—OC(=O)NR$^g$S(=O)O—*, or a combination thereof, and
R$^d$ to R$^g$ are independently hydrogen, a substituted or unsubstituted C1 to C20 alkyl group, a substituted or unsubstituted C6 to C20 aryl group, or a combination thereof.

6. The surface coating material of claim 1, wherein each fluorine-containing silicon compound of the plurality of fluorine-containing silicon compounds is represented by Chemical Formula 2, PF-(L$^2$)$_{p1}$-IN-(L$^3$)$_{p2}$-SiR$^a$R$^b$R$^c$  [Chemical Formula 2]

wherein, in Chemical Formula 2,
PF is a fluorine-containing (poly)ether moiety,
R$^a$, R$^b$, and R$^c$ are independently hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof,
at least one of R$^a$, R$^b$, or R$^c$ is a substituted or unsubstituted C1 to C20 alkoxy group, a halogen, or a hydroxy group,
IN is a linking group including a hydrogen-bondable functional group,
L$^2$ and L$^3$ are independently substituted or unsubstituted C1 to C20 alkylene group, a substituted or unsubstituted C6 to C20 arylene group, a substituted or unsubstituted C1 to C20 oxyalkylene group, or a combination thereof, and
p1 and p2 are independently an integer ranging from 0 to 10.

7. The surface coating material of claim 6, wherein in Chemical Formula 2,
PF is perfluoro(poly)ether.

8. The surface coating material of claim 6, wherein in Chemical Formula 2,
PF is CF$_3$O(CF$_2$CF$_2$O)$_n$(CF$_2$O)$_m$CF$_2$, and
n and m are independently integers ranging from 1 to 100.

9. The surface coating material of claim 6, wherein in Chemical Formula 2,
IN is *—C(=O)NR$^d$—*, *—OC(=O)NR$^e$—*, *—OC(=O)NR$^g$S(=O)—*, OC(=O)NR$^g$S(=O)O—*, or a combination thereof, and
R$^d$ to R$^g$ are independently hydrogen, a substituted or unsubstituted C1 to C20 alkyl group, a substituted or unsubstituted C6 to C20 aryl group, or a combination thereof.

10. A film, comprising:
a polymer of a plurality of fluorine-containing silicon compounds; and
an additive represented by Chemical Formula 1,
wherein each fluorine-containing silicon compound of the plurality of fluorine-containing silicon compounds includes a fluorine-containing (poly)ether moiety, a hydrolytic silane moiety, and a linking group between the fluorine-containing (poly)ether moiety and the hydrolytic silane moiety, the linking group configured to form a non-covalence interaction between adjacent molecules, R$^1$-L$^1$-MX$^1$X$^2$X$^3$  [Chemical Formula 1]

wherein, in Chemical Formula 1,
R$^1$ is a halogen, a thiol group, an isocyanate group, or an amino group,
L$^1$ is a substituted or unsubstituted C1 to C20 alkylene group or a substituted or unsubstituted C6 to C20 arylene group,
M is Si, Ti, or Zr, and
X$^1$, X$^2$, and X$^3$ are independently hydrogen, a substituted or unsubstituted C1 to C20 alkoxy group, halogen, a hydroxy group, amide group, a substituted or unsubstituted C1 to C20 alkyl group, a substituted or unsubstituted C6 to C20 aryl group, or a combination thereof,
wherein at least one of X$^1$, X$^2$, or X$^3$ is a substituted or unsubstituted C1 to C20 alkoxy group, a halogen, or a hydroxy group,
wherein the polymer of the plurality of fluorine containing silicon compounds and the additive represented by Chemical Formula 1 are include in the film in a weight ratio of about 1:0.003 to about 1:0.5,
wherein the plurality of flouring-containing silicon compounds have a linear molecular geometry.

11. The film of claim 10, wherein the additive represented by Chemical Formula 1 includes three or more carbons.

12. The film of claim 10, wherein the plurality of fluorine-containing silicon compounds have a weight average molecular weight of about 4,000 g/mol to about 10,000 g/mol.

13. The film of claim 10, wherein the linking group includes a hydrogen-bondable linking group.

14. The film of claim 13, wherein
the hydrogen-bondable linking group includes *—C(=O)NR$^d$—*, *—OC(=O)NR$^e$—*, *—OC(=O)NR$^g$S(=O)—*, *—OC(=O)NR$^g$S(=O)O—*, or a combination thereof, and
R$^d$ to R$^g$ are independently hydrogen, a substituted or unsubstituted C1 to C20 alkyl group, a substituted or unsubstituted C6 to C20 aryl group, or a combination thereof.

15. The film of claim 10, wherein each fluorine-containing silicon compound of the plurality of fluorine-containing silicon compounds is represented by Chemical Formula 2, PF-(L$^2$)$_{p1}$-IN-(L$^3$)$_{p2}$-SiR$^a$R$^b$R$^c$  [Chemical Formula 2]

wherein, in Chemical Formula 2,
PF is a fluorine-containing (poly)ether moiety,
R$^a$, R$^b$, and R$^c$ are independently hydrogen, a substituted or unsubstituted C1 to C20 alkoxy group, a halogen, a hydroxy group, a substituted or unsubstituted C1 to C20 alkyl group, a substituted or unsubstituted C6 to C20 aryl group, or a combination thereof,
at least one of R$^a$, R$^b$, or R$^c$ is a substituted or unsubstituted C1 to C20 alkoxy group, a halogen, or a hydroxy group,
IN is a linking group including a hydrogen-bondable functional group,
L$^2$ and L$^3$ are independently substituted or unsubstituted C1 to C20 alkylene group, a substituted or unsubstituted C6 to C20 arylene group, a substituted or unsubstituted C1 to C20 oxyalkylene group, or a combination thereof, and p1 and p2 are independently an integer ranging from 0 to 10.

16. The film of claim 15, wherein
in Chemical Formula 2,
PF is perfluoro(poly)ether.

17. The film of claim 15, wherein
in Chemical Formula 2,
PF is $CF_3O(CF_2CF_2O)_n(CF_2O)_mCF_2$, and
n and m are independently integers ranging from 1 to 100.

18. The film of claim 15, wherein
in Chemical Formula 2,
IN is *—C(=O)NR$^d$—*, *—OC(=O)NR$_e$—*, *—OC(=O)NR$^g$S(=O)—*, OC(=O)NR$^g$S(=O)O—*, or a combination thereof, and
R$^d$ to R$^g$ are independently hydrogen, a substituted or unsubstituted C1 to C20 alkyl group, a substituted or unsubstituted C6 to C20 aryl group, or a combination thereof.

19. The film of claim 10, wherein the film is a coated film or a deposited film.

20. A stacked structure, comprising:
a substrate, and
the film of claim 10.

21. The stacked structure of claim 20, wherein the substrate is a ceramic or a glass plate.

22. A display device comprising the film of claim 10.

23. A display device comprising the stacked structure of claim 20.

24. An article comprising a glass substrate coated with the surface coating material of claim 1.

25. A method, comprising:
providing a glass substrate; and
coating the surface coating material of claim 1 on at least one surface of the glass substrate to form a display device.

26. The method of claim 25, wherein the coating includes
coating the at least one surface of the glass substrate according to a solution process, or
depositing the surface coating material on the at least one surface of the glass substrate through a dry process.

27. The method of claim 25, further comprising:
manufacturing an article including the display device.

* * * * *